No. 885,531. PATENTED APR. 21, 1908.
J. W. SALMONS.
WATER TANK FOR POULTRY SHIPPING COOPS.
APPLICATION FILED SEPT. 24, 1906.
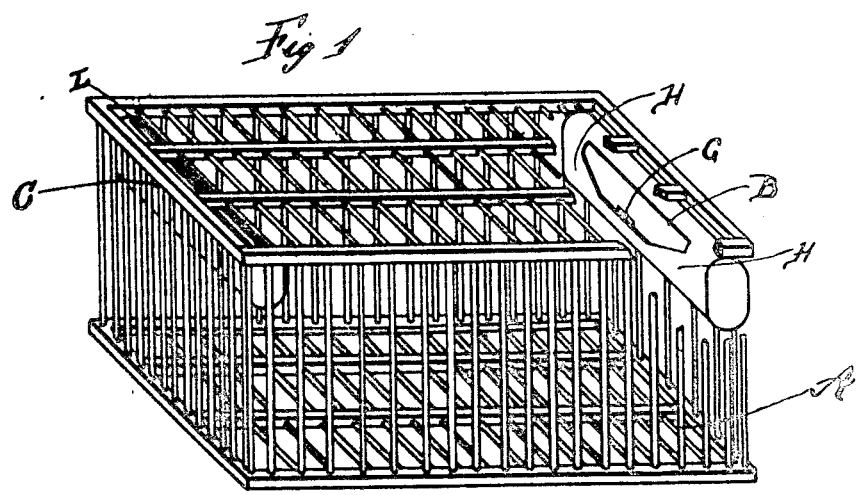
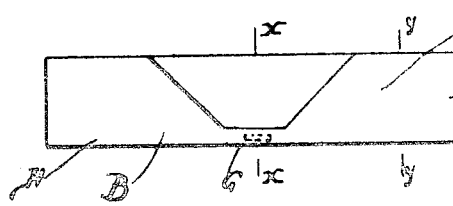 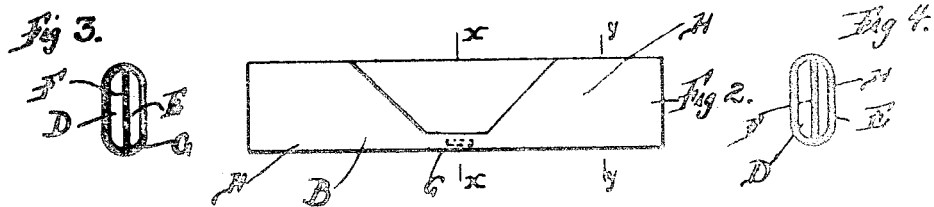 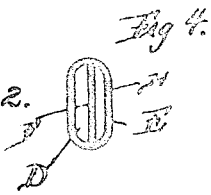
WITNESSES:
INVENTOR
John W. Salmons
BY
ATTORNEY.

UNITED STATES PATENT OFFICE.

JOHN W. SALMONS, OF PHILADELPHIA, PENNSYLVANIA.

WATER-TANK FOR POULTRY-SHIPPING COOPS.

No. 885,531.   Specification of Letters Patent.   Patented April 21, 1908.

Application filed September 24, 1906. Serial No. 335,875.

*To all whom it may concern:*

Be it known that I, JOHN W. SALMONS, a citizen of the United States, residing at Philadelphia, county of Philadelphia, and State of Pennsylvania, have invented a certain new and useful Improvement in Water-Tanks for Poultry-Shipping Coops, of which the following is a specification.

My invention relates to a new and useful improvement in water tanks for poultry shipping coops, and has for its object to improve the construction of the water tank.

With these ends in view, this invention consists in the details of construction and combination of elements hereinafter set forth and then specifically designated by the claims.

In order that those skilled in the art to which this invention appertains may understand how to make and use the same, I will describe its construction in detail, reference being had to the accompanying drawing forming a part of this specification, in which—

Figure 1 is a perspective of a coop made in accordance with my improvement showing the water tank therein. Fig. 2, a front elevation of the water supply tank. Fig. 3, a section at the line $x$—$x$ of Fig. 2. Fig. 4, a section at the line $y$—$y$ of Fig. 2.

In carrying out my invention as here embodied, A represents the coop, which is preferably made rectangular in form and of open work so as to permit the free circulation of air therethrough, and this coop may have any suitable removable cover or opening for access thereto. Within the coop I secure near the top thereof the automatic water tank B.

The water tank B may be made of any suitable material such as sheet metal, and consists of two compartments D and E separated from each other by the partition F, there being a small opening G, at the bottom of the partition so as to permit the water to flow from the compartment D, into the compartment E, as it is used by the fowls. The compartment E, is partly closed in by outer inclined walls H, leaving the central V-shaped aperture to permit the access by the fowls to the water contained in this compartment, and the object of the walls is to prevent the water from being spilled when the coop is being handled as the water which may be contained in the compartment E, will flow to one end or the other thereof should the coop be tipped and the walls will prevent it from flowing from the compartment.

In filling the tank, it is submerged in a quantity of water with the opening G, at the top and it is through this opening that the compartment D, is filled. When the tank is returned to its normal position, the water in the compartment is prevented from flowing into compartment E, except as it is used by the atmospheric pressure. It will be further observed that the front and the back walls of the water tank are connected by top and bottom walls of semi-circular form in cross section, first for economy of material and general appearance, and second to cause the water or whatever the contents of the tank may be, when but a small quantity thereof remains in the tank, to seek the lowest level of the bottom at which point it will be in vertical alinement with the opening G.

By the use of my improvement fowls may be in transit from thirty-six to forty-eight hours, and by enlarging the tank time may be extended seventy-two hours and more if distance requires, without in any wise suffering, as the water will be automatically supplied for their use, and they cannot waste the water as the tank is at the top of the coop and the contents thereof cannot be spilled by any reasonable amount of jostling or tipping of the latter.

Having thus fully described my invention, what I claim as new and useful, is—

A water tank consisting of front and back parallel straight walls, end walls, and semi-circular top and bottom walls, a partition extending from the central points of the width of said top and bottom and being disposed parallel with each of said front and back walls and of greater width than the latter, said partition being formed with a central elongated opening which terminates flush with the upper face of said bottom wall, the front wall having a V-shaped cut-out portion therein which extends from points slightly above the top of said elongated opening to the front face of said partition.

In testimony whereof, I have hereunto affixed my signature in the presence of two subscribing witnesses.

JOHN W. SALMONS.

Witnesses:
JAMES E. CLARK,
JOHN G. FORD.